United States Patent [19]

Fisher

[11] Patent Number: 4,849,868

[45] Date of Patent: Jul. 18, 1989

[54] PULSE WIDTH MODULATED SWITCHING POWER SUPPLY

[75] Inventor: Mark C. Fisher, Pasadena, Tex.

[73] Assignee: Tideland Signal Corporation, Houston, Tex.

[21] Appl. No.: 266,548

[22] Filed: Nov. 3, 1988

[51] Int. Cl.[4] ............................................. H02M 3/335
[52] U.S. Cl. ........................................ 363/21; 363/80; 363/97; 363/131; 323/267
[58] Field of Search ...................... 363/18–21, 363/41, 78–80, 95, 97–98, 131–134; 323/267

[56] References Cited

U.S. PATENT DOCUMENTS

| | | | |
|---|---|---|---|
| 4,230,981 | 10/1980 | Rambold | 323/267 |
| 4,419,723 | 12/1983 | Wilson, Jr. | 363/21 |
| 4,510,564 | 4/1985 | Seer, Jr. | 363/80 |
| 4,538,219 | 8/1985 | Morris et al. | 363/97 |
| 4,652,987 | 3/1987 | Matthews et al. | 323/267 |
| 4,745,538 | 5/1988 | Cross et al. | 363/21 |

FOREIGN PATENT DOCUMENTS 0946213 1/1964 United Kingdom ............... 323/267

*Primary Examiner*—Peter S. Wong
*Attorney, Agent, or Firm*—Fulbright & Jaworski

[57] ABSTRACT

An improved regulator circuit for a pulse width modulated power supply having an input switch and a plurality of different output voltages. A precision reference voltage is connected to one or more op-amplifiers and/or divider networks, each of which is connected to an output voltage for translating the outputs to ground when the voltages are properly regulated. A differential amplifier is connected to each of the operational amplifiers and divider networks. When the absolute value of any voltages goes low, the corresponding input to the differential amplifier rises and diverts drive current from an optoisolator for increasing the duty cycle of the input switch.

6 Claims, 1 Drawing Sheet

PULSE WIDTH MODULATED SWITCHING POWER SUPPLY

BACKGROUND OF THE INVENTION

There are various types of power supplies which have an input switch and a plurality of output voltages. The voltage level at the outputs are determined by modulating the pulse width or duty cycle of the input switch. That is, when the value of the output voltages are low, the duty cycle of the input switch is increased to raise the output voltages.

The present invention provides a regulator to perform this operation by feedback from the output and is accomplished in that the controlling voltage in the regulator is always the lowest voltage or the most heavily loaded output.

SUMMARY

The present invention is directed to a pulse width modulated switching supply circuit having an input switching means and a plurality of different output voltages and which includes an improvement in a regulator circuit. A voltage reference means is connected to one of the outputs for supplying a precision voltage reference. Translation means are connected between the voltage reference means and each of the outputs for translating each of the output voltages to ground when the voltages are properly regulated. A differential amplifier is connected to the translation means for receiving each of the translated output voltages. An optoisolator is connected to the differential amplifier and to the input switching means. When the output voltages are properly regulated the input switching means is turned to its lowest duty cycle. However, when the absolute value of any output voltage is low, the differential amplifier diverts current from the opto-isolator which increases the duty cycle of the input switching means.

Still a further object of the present invention is wherein the translation means includes a plurality of operational amplifiers and/or divider networks.

Still a further object of the present invention is wherein the differential amplifier includes a plurality of transistors, one of which is normally biased to carry the load and the other transistors are each connected to one of the translated output voltages.

Still a further object of the present invention is the provision of an improved regulator circuit having a voltage reference means and a plurality of operational amplifiers each having an input and an output in which each of the inputs is connected to one of the output voltages for translating each of the output voltages to ground at the amplifier inputs when the voltages are properly regulated. A differential amplifier is provided including a plurality of inputs, one of which is biased to carry the load and each of the other transistors are connected to one of the operational amplifier outputs. An optoisolator is connected to the differential amplifier and to the input switching means for varying the duty cycle of the input switching means in response to the value of the output voltages. In addition, the circuit may include a plurality of divider networks, each of which is connected to one of the output voltages for translating said connected output voltages to ground when the output voltages are properly regulated.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
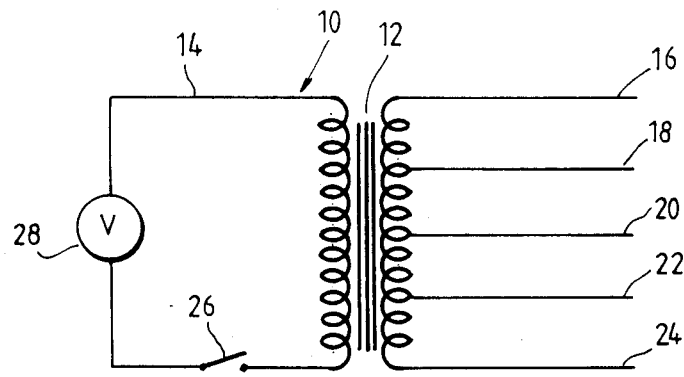
FIG. 1 is an electrical schematic of a conventional pulse width modulated switching power supply circuit.

Referring now to FIG. 1, various types of pulse width modulated switching power supply circuits may be Provided as generally indicated by the reference numerical 10 that utilize a duty cycle to determine the output voltage based on the load that is demanded by some output. For example, a transformer or inductor 12 is provided having an input 14 and a plurality of output voltages 16, 18, 20, 22, and 24. A input switching means such as switch 26 is provided in the input 14 connected to a power supply 28 through the inductor 12 to provide output voltages of the desired magnitude.

Figure 2:
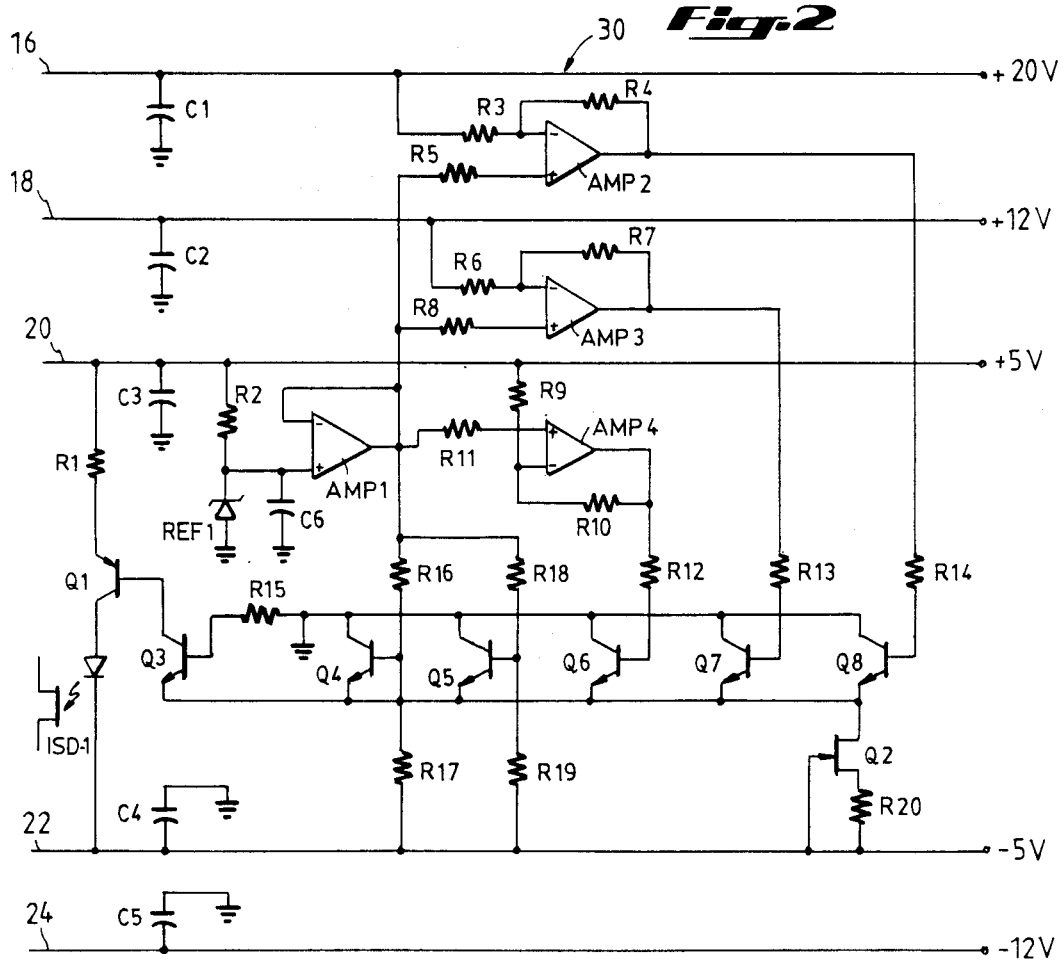
FIG. 2 is an electrical schematic diagram of a regulator circuit, modulating the pulse width of the input, in accordance with the present invention.
Figure 1:
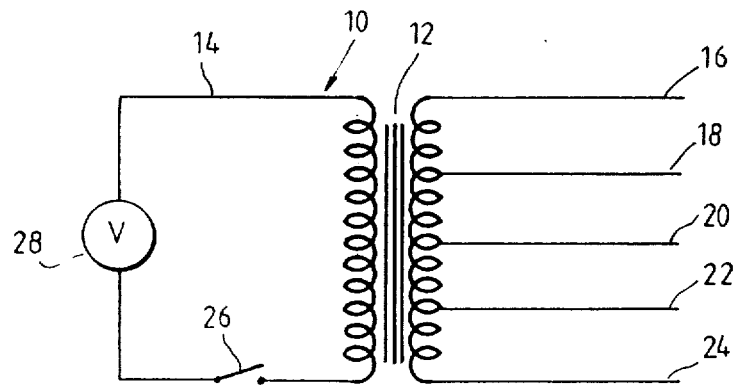
Figure 2:
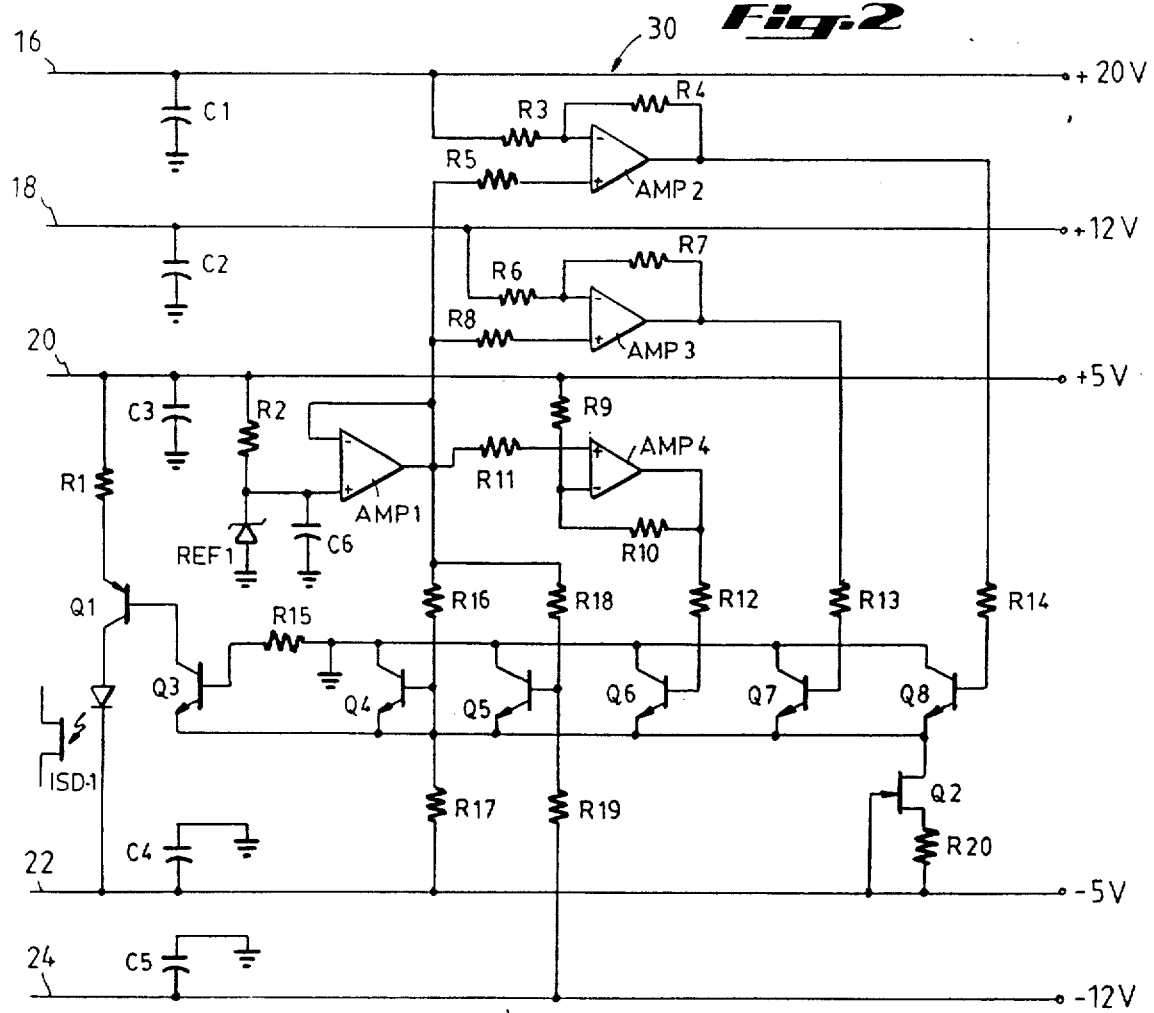

The present invention is directed to a regulator circuit, as best seen in FIG. 2, and generally indicated by the referenced numeral 30, which modulates the pulse width of the input circuit 14 by feedback from the secondary circuit. The present invention accomplishes this regulation by feedback from the lowest voltage or most heavily loaded supply rather than depending upon the cross-regulation of other outputs.

Referring now to FIG. 2, and by way of example only, the outputs of the power supply 10 are 16, 18, 20, 22 and 24 and are connected to capacitors C1, C2, C3, C4, C5, respectively, which are the filtering means. In the example shown, the outputs have voltage levels of plus 20, plus 12, plus 5, minus 5, and minus 12, respectively. REF1 establishes a precision voltage reference, here a plus 2.5 volt precision reference. REF1 is connected to output line 20 and provides an output of plus 2.5 volts which is fed on the positive input of buffer amplifier amp 1. The output of amplifier amp 1 is fed back to its negative input, resulting in a precision 2.5 volt reference for op amplifiers amp 2, amp 3 and amp 4. Amplifiers amp 2 through amp 4 translate their regulated outputs; that is to say, positive regulated outputs plus 20, plus 12 and plus 5 to ground by the selection of the ratios of R4 to R3, R7 to R6, and R10 to R9, respectively. These ratios will effectively translate the output voltages on line 16, 18 and 20 to ground. That is, when plus 5 is properly regulated to plus 5 volts, then the output of amp 4 will be ground. Similarly, when plus 12 volts on line 18 is exactly plus 12 volts, the output of amp 3 will be ground. And similarly, when plus 20 volts on line 16 is exactly plus 20, the output of amp 2 will be ground. If the value of the voltage plus 20 becomes too low, then the output of amp 2 will rise above ground; if the plus 12 voltage on output 18 is too low, the output of amp 3 will rise above ground; and if the plus 5 voltage on line 20 is too low, the output of amp 4 will rise above ground.

The negative voltages on output lines 22 and 24 are translated to ground by simple resistor divider networks. Minus 5 volts on line 22 is translated to ground by the divider network of R16 and R17. The minus 12 volts on line 24 is translated to ground by the divider network of R18 and R19.

The output of the various translation means, amp 2, amp 3, amp 4, divider networks R16 and R17 and R18 and R19 are applied to the inputs of a differential amplifier which includes transistors Q3, Q4, Q5, Q6, Q7, and Q8. Transistor Q3 is normally biased to carry all of the current which is flowing through the active load represented by the resistor-transistor combination of Q2 and R20. When all of the voltages on output line 16, 18, 20, 22 and 24 are at the proper regulation, that is the output of their respectively translation means, amp 2, amp 3, amp 4, divider network R16 and R17, and divider network R18 and R19, have an output at ground, Q3 is carrying all of the current and all of the current of Q2 and R20 is in the collector of Q3 which in turns serves as a drive to Q1. Q1 serves as a current multiplier, causing all of the current that is in Q3 to be in the base of Q1 which then multiplies that current but that is limited by R1. All of the current that flows through R1 also flows through the input photodiode of optoisolator iso-1. When Q3 is carrying all of the current, there is a maximum drive to the photodiode of iso-1 where it controls the duty cycle of the input switch 26 (FIG. 1). The input switch 26 is turned to the lowest possible duty cycle when all of the voltages on the output 16, 18, 20, 22 and 24 are in close regulation.

One of the features of the regulation scheme of the present invention is that the controlling voltage in the regulator 30 is always the lowest voltage or most heavily loaded. When the absolute value of any of the output voltages on lines 16, 18, 20, 22 and 24 is too low, its corresponding input to the differential amplifier rises and diverts drive current from the optoisolator iso-1 which increases the duty cycle of the input switch 26 and therefore raises the voltage values on the outputs 16, 18, 20, 22 and 24.

For example, assuming that the plus 20 volts on output line 16 goes below plus 20, the output of amp 2 would rise above ground supplying drive through R14 to Q8 Q8 is a Part of the differential amplifier and the voltage at the emitter of Q8 is held very tightly at a specific voltage Point by the differential amplifier. However, if Q8 rises above that point, then some of the current that would normally flow through Q3 will go through the collector of transistor Q8, which then happens to have a higher base voltage and cause drive to be diverted away from Q3. This would cause less current to flow through Q1 and hence through the input photodiode of iso-1 causing there to be less feedback to the input circuit 14 and the input switch 26. This causes the switch 26 to have a greater duty cycle, supplying more output voltage causing the output voltages on lines 16, 18, 20, 22 and 24. It is to be noted that all of the outputs are regulated together. That is, if one of the voltages on the output lines 16, 18, 20, 22 and 24 is too high, it will not cause the input 14 to shut down. However, whichever one of the output voltages is lowest, will cause the input 14 to have a greater duty cycle. The duty cycle is increased by the drive to any one of the transistors Q4 through Q8 to be greater which would thereby allow the input circuit 14 to have a greater drive until the output voltages increased.

The minus voltages of minus 5 and minus 12 function similarly to the outputs of the amp 2 through amp 4. That is, if minus 12 goes lower than minus 12, the voltage at the base of Q5 will go below ground, but that does not cause Q5 to turn on, but turns it off more. However, when minus 12 goes high to somewhere between ground, for example 11.9 volts, this would cause the voltage at the base of Q5 to rise. In turn, this would cause drive to be applied to the base of Q5 diverting current from the collector of Q3 and allowing the input circuit 14 to have a greater duty cycle. Similarly, the minus 5 volt output on line 22 is connected to and controls the voltage at the base of transistor Q4.

Therefore, the present invention provides an improvement in a regulator circuit for a pulse width modulated switching power supply circuit having input switching means and a plurality of different output voltages by modulating the pulse width of the input circuit for controlling the duty cycle of the input switching means by feedback from the lowest or most heavily loaded output supply voltage.

The present invention, therefore, is well adapted to carry out the objects and attain the ends and advantages mentioned, as well as others inherent therein. While a presently preferred embodiment of the invention has been described for the purpose of disclosure, numerous changes in the details of construction and arrangement of parts will be readily apparent to those skilled in the art and which are encompassed within the spirit of the present invention and the scope of the appended claims.

What is claimed is:

1. In a pulse width modulated switching power supply circuit having an input switching means and a plurality of different output voltages, the improvement in a regulator circuit comprising, voltage reference means connected to one of the output for supplying a precision voltage reference, translation means connected between the voltage reference means and each of the outputs for translating each of the output voltages to ground when the voltages are properly regulated, a differential amplifier connected to the translation means for receiving each of the translated output voltages, an optoisolator connected to the differential amplifier and to the input switching means whereby when the output voltages are properly regulated their input switching means is turned to its lowest duty cycle, but when the absolute value of any output voltage is low the differential amplifier diverts current from the optoisolator which increases the duty cycle of the input switching means.

2. The circuit of claim 1 wherein the translation means includes a plurality of operational amplifiers.

3. The circuit of claim 1 wherein the translation means includes divider networks.

4. The circuit of claim 1 wherein the differential amplifier includes a plurality of transistors, one of which is normally biased to carry the load, and other transistors are each connected to one of the translated output voltages.

5. In a Pulse width modulated switching power supply circuit having an input switching means and a plurality of different output voltages, the improvement in a regulator circuit comprising, voltage reference means connected to one of the outputs for supplying a precision voltage reference, a plurality of operational amplifiers, each having an input and an output, each of the inputs is connected to one of the output voltages for translating each of the output voltages to ground at the amplifier outputs when the voltages are properly regulated, a differential amplifier including a Plurality of transistors, one of which is biased to carry the load, and each of the other transistors are connected to one of the operational amplifier outputs, an optoisolator connected to the differential amplifier and to the input switching means for varying the duty cycle of the input switching means in response to the value of the output voltages.

6. The circuit of claim 5 including a plurality of divider networks, each of which is connected to one of the output voltages for translating said connected output voltages to ground when the output voltages are properly regulated.

* * * * *

UNITED STATES PATENT AND TRADEMARK OFFICE
CERTIFICATE OF CORRECTION

PATENT NO. : 4,849,868

DATED : July 18, 1989

INVENTOR(S) : Mark C. Fischer

It is certified that error appears in the above-identified patent and that said Letters Patent is hereby corrected as shown below:

On the title page, item [75], correct spelling of the inventor's name from "Fisher" to --Fischer--.

The sheet of drawings should be deleted to be replaced with the sheet of drawings as shown.

Signed and Sealed this

Eleventh Day of June, 1991

Attest:

HARRY F. MANBECK, JR.

*Attesting Officer*  *Commissioner of Patents and Trademarks*